United States Patent
Stählin et al.

(10) Patent No.: US 8,942,661 B2
(45) Date of Patent: Jan. 27, 2015

(54) METHOD AND DEVICE FOR TRIGGERING AN EMERGENCY CALL IN A VEHICLE EQUIPPED WITH AN AIRBAG

(75) Inventors: Ulrich Stählin, Eschborn (DE); Peter E. Rieth, Eltville (DE); Jürgen Diebold, Eschborn (DE); Marc Menzel, Weimar (DE); Andreas Schirling, Darmstadt (DE); Michael Feser, Barbing (DE)

(73) Assignee: Continental Automotive GmbH, Hannover (DE)

( * ) Notice: Subject to any disclaimer, the term of this patent is extended or adjusted under 35 U.S.C. 154(b) by 333 days.

(21) Appl. No.: 13/578,203

(22) PCT Filed: Feb. 10, 2011

(86) PCT No.: PCT/EP2011/051917
§ 371 (c)(1),
(2), (4) Date: Sep. 12, 2012

(87) PCT Pub. No.: WO2011/098498
PCT Pub. Date: Aug. 18, 2011

(65) Prior Publication Data
US 2013/0005292 A1    Jan. 3, 2013

(30) Foreign Application Priority Data
Feb. 11, 2010 (DE) .......................... 10 2010 007 607

(51) Int. Cl.
*H04M 11/04* (2006.01)
*B60R 21/01* (2006.01)
*H04L 12/64* (2006.01)

(52) U.S. Cl.
CPC ............. *B60R 21/01* (2013.01); *H04L 12/6418* (2013.01)
USPC ........................................ 455/404.1; 340/479

(58) Field of Classification Search
CPC ..... H04W 76/007; H04W 4/22; H04M 11/04; B60Q 1/44; B60Q 1/444; B60Q 1/302
USPC ........................................ 455/404.1; 340/479
See application file for complete search history.

(56) References Cited

U.S. PATENT DOCUMENTS

| | | | |
|---|---|---|---|
| 6,124,784 A | 9/2000 | Wells | |
| 7,580,697 B2 * | 8/2009 | Lappe et al. | 455/404.1 |
| 2002/0075166 A1 | 6/2002 | Yoshioka | |
| 2002/0105423 A1 * | 8/2002 | Rast | 340/479 |
| 2008/0203814 A1 | 8/2008 | Kamiya | |
| 2008/0228349 A1 | 9/2008 | Nakamura | |

FOREIGN PATENT DOCUMENTS

| | | |
|---|---|---|
| DE | 93 18 057 | 9/1994 |
| DE | 93 18 057 U1 | 9/1994 |
| DE | 196 29 819 A1 | 9/1997 |
| DE | 100 39 693 | 3/2002 |
| DE | 100 39 693 A1 | 3/2002 |
| DE | 101 37 670 | 4/2002 |
| DE | 101 37 670 A1 | 4/2002 |
| DE | 10 2005 021 115 A1 | 11/2006 |
| GB | 2241852 * | 9/1991 |
| WO | WO 2008/125654 A2 | 10/2008 |
| WO | WO 2009/024581 A1 | 2/2009 |

* cited by examiner

Primary Examiner — William D Cumming
(74) Attorney, Agent, or Firm — Cozen O'Connor

(57) ABSTRACT

A method and a device for triggering an emergency call in a vehicle equipped with an airbag. The device can be retrofitted in a vehicle equipped with an airbag to provide an emergency system which, in the event of an airbag being triggered, sends an emergency call (Ecall) to a suitable emergency call center in order to initiate auxiliary measures as may be necessary.

12 Claims, 2 Drawing Sheets

METHOD AND DEVICE FOR TRIGGERING AN EMERGENCY CALL IN A VEHICLE EQUIPPED WITH AN AIRBAG

CROSS REFERENCE TO RELATED APPLICATION

This is a U.S. national stage of application No. PCT/EP2011/051917, filed on 10 Feb. 2011. Priority is claimed on German Application No. 10 2010 007 607.4, filed 11 Feb. 2010, the content of which is incorporated here by reference.

BACKGROUND OF THE INVENTION

1. Field of the Invention

The present invention relates to a method and a device for triggering an emergency call in a vehicle equipped with an airbag. The stated method and the stated device make it possible to retrofit a vehicle equipped with an airbag with an emergency system which, in the event of an airbag being triggered, sends an emergency call (Ecall) to a suitable emergency call center to initiate any auxiliary measures which may be necessary.

2. Description of Prior Art

Modern vehicles have had airbag systems for many years, which systems, in the event of an accident, in particular in the event of a collision, are intended to damp the acceleration forces acting on an occupant's body by pyrotechnically inflated airbags and are intended to prevent occupants from colliding with parts of the vehicle interior if high acceleration forces occur.

Furthermore, due to progress in telecommunications, many vehicle users are equipped with mobile telephones or the vehicles have mobile telephone devices.

Depending on the forces acting during an accident, a situation may occur in which occupants are prevented from getting help as a result of injuries or other circumstances. In such cases, it has proved to be useful to transmit an emergency call in an automated manner.

Automated emergency calls, so-called Ecalls, are known from the prior art. Within the European Union, there are also attempts to standardize an Ecall system to be able to transnationally provide a functional emergency call system. In new vehicles, it is usually possible to integrate suitable emergency call systems without any problems since it is possible to provide an appropriate signal output for triggering an Ecall in the airbag control system of new vehicles. It is more problematic to retrofit an emergency call system in vehicles which have not been equipped with corresponding systems at the factory. This is due, in particular, to the fact that airbag systems are pyrotechnic devices which are not allowed to be tampered with at all for safety reasons. For example, tampering with the airbag system in Germany results in the general operating license for the vehicle being terminated, as a result of which it is no longer possible to travel in public transport areas.

However, it is desirable for older vehicles to be retrofitted with an emergency call system that could automatically transmit an emergency call in the event of an accident that triggers an airbag.

SUMMARY OF THE INVENTION

An object of one embodiment of the invention is to specify a method and a device that reliably initiates the triggering of an emergency call without the need to change the airbag control system.

One embodiment of the invention is a method for triggering an emergency call, via a telecommunications or radio network, in a vehicle equipped with an airbag. The emergency call is initiated based at least in part on a magnetic, electrical and/or electromagnetic field induced by the firing of an airbag.

To trigger an airbag, a firing voltage is generated in an airbag control system and is applied to a detonator of an airbag. This causes the detonator to explode.

The explosion gases released in the process result in the airbag being deployed and in the desired cushion being formed. The airbag control system and detonator are connected to one another via a connecting line. The latter generally consists of two cores that are not twisted with one another, one of which carries the firing voltage, while the second ensures a ground connection needed to close the circuit. To fire the airbag, a firing current of 1 A to 2 A generally flows for 1.5 ms to 3 ms. The firing current is regulated to the stated value in order to save the energy reserves of the vehicle. In addition, the firing pellets used for triggering have a very low impedance so that there is no need for higher currents.

On account of the inductance in the cabling, voltages of approximately 600 V occur when an airbag is fired. These voltages result in the formation, in the lines, of a magnetic, electrical and/or electromagnetic field that can be detected using suitable devices and can be used, according to one embodiment of the invention, to reliably initiate an emergency call.

Detection of the induced field does not require any tampering at all with the closed firing system of the airbag and thus does not have any safety-relevant influence on the airbag control system. This avoids the general operating license being terminated as a result of an Ecall system being retrofitted.

To detect the induced field different procedures are possible according to embodiments of the invention. In one refinement of the method according to one embodiment of the invention, the magnetic field induced by the firing current in the lines leading from the airbag control system to the detonator is detected and/or measured using a magnetic field sensor. Suitable magnetic field sensors are, for example, a Rogowski coil, a Hall sensor, a magnetoresistive sensor, a Wiegand sensor, or a SQUID sensor.

In an exemplary case using a Rogowski coil, which is a ferrite core around which a wire coil has been wound, such a coil is placed around the firing cable. The firing current in the cables induces a magnetic field which generates a corresponding signal in the coils. This signal can be conditioned using suitable amplifiers and/or integration electronics. If the signal exceeds a predefined limit value, it can be assumed that a firing current for triggering an airbag has flowed through the firing line, and an Ecall can be triggered in a communication system using suitable control electronics. A communication system in the sense of this invention may be a mobile telephone system, a radio system, or a telecommunications system integrated in the vehicle. To connect the communication system to the Ecall system, said systems may be connected to one another, for signaling purposes, either in a wired or a wireless manner, for example by Bluetooth, ZigBee, WLAN, etc.

To improve the detection of the induced magnetic field, the invention may provide for each of the two lines of the firing cable to be provided with its own sensor. This enables differentiated detection of the firing pulse.

In another refinement of the invention, the electrical field induced by the firing current in the firing cable is detected and used as the basis for triggering the Ecall. For this purpose, provision may be made for the individual lines of the firing cable to be guided through a groove which is lined with a metal, in which case a structure corresponding to a coaxial capacitor in terms of design is produced. The signal capacitively coupled to the grooves by the firing current flowing through the lines can then be amplified and evaluated. If a limit value is exceeded, the transmission of a corresponding emergency call (Ecall) can then be initiated.

In another refinement of the invention, the electromagnetic field (EM field) induced by the firing current is converted or conditioned into the triggering variable for transmitting an emergency call. For this purpose, provision may be made for the EM field induced by the firing current to be detected using an antenna, which is connected to corresponding amplification and evaluation electronics, as a far field. On account of the high firing voltage or the high firing current, a field induced by the firing of an airbag can be clearly distinguished from other fields in the vehicle. In particular, in the case of such a system, it is advantageously possible to provide an individual antenna in the vehicle, which antenna can monitor all airbags installed in the vehicle. In this case, firing of a plurality of airbags, for example driver and front-seat passenger airbags, results in improved detection of the triggering as a result of the plurality of EM fields. Even the firing of further pyrotechnic safety devices, for example belt tensioners, can be taken into account with this type of detection.

In another advantageous refinement of the invention, the emergency call is triggered only with some latency. This makes it possible to determine whether the detected pulses can also actually be attributed to the firing of airbags. Furthermore, one embodiment of the invention may provide for different sensors and detection possibilities of the type described above to be combined with one another to form a system in order to increase the detection accuracy of the method. In the method according to one embodiment of the invention, provision may also be made for further sensor information, for example data from an acceleration sensor or an acoustic sensor, to be taken into account when making a decision on the initiation of an emergency call. It is also within the scope of the invention to take into account information or signals, which may be provided via a reaction-free CAN tap of the vehicle electronics, in the method for initiating an emergency call.

With regard to the device, the object of one embodiment of the invention is achieved by a device for triggering an emergency call in a vehicle equipped with an airbag, having a device for transmitting an emergency call, a device for measuring a magnetic, electrical, and/or electromagnetic field induced by the firing of an airbag, and a control device. The control device is connected, for control purposes, to the device for transmitting the emergency call and the device for measuring the magnetic, electrical, and/or electromagnetic field in such a manner that, when a field strength exceeding a stored limit value is measured, a triggering pulse for triggering an emergency call can be sent from the control device to the emergency call device.

To detect the magnetic, electrical and/or electromagnetic field, the device may have at least one sensor from the group consisting of a Rogowski coil, a Hall sensor, a magnetoresistive sensor, a Wiegand sensor, a SQUID sensor, a coaxial capacitor, and an electromagnetic far-field sensor.

This type of sensor allows the fields induced by the firing of an airbag to be detected in a reliable way and in a manner Insensitive to interference.

Furthermore, provision may be made for setting a field strength limit value, the exceeding of which causes the device to initiate the transmission of an emergency call. As a result, the device can be advantageously adapted to different vehicle types and/or airbag types.

The device may be connected to a mobile telephone, a radio system and/or a telecommunications system permanently integrated in the vehicle in a wired or wireless manner. This may be effected, for example, using suitable adapter cables or else using a wireless communication interface, for example Bluetooth, ZigBee, WLAN, etc.

The signal initiating the emergency call may be a stored telephone number, a short message (SMS), or another suitable signal. One refinement of the invention may also provide for information relating to the location of the vehicle, which is obtained, for example, using a GPS receiver connected to the system, to be transmitted with the signal initiating the transmission of an emergency call.

The invention may provide for the device to have a combination of at least two of the sensors mentioned and/or further sensors for detecting airbag triggering, in particular an acceleration sensor and/or an acoustic sensor, which are connected to the control device.

BRIEF DESCRIPTION OF THE DRAWINGS

The invention is explained by way of example below using preferred exemplary embodiments and with reference to the accompanying drawings, in which.

DETAILED DESCRIPTION OF THE PREFERRED EMBODIMENTS

Figure 1:
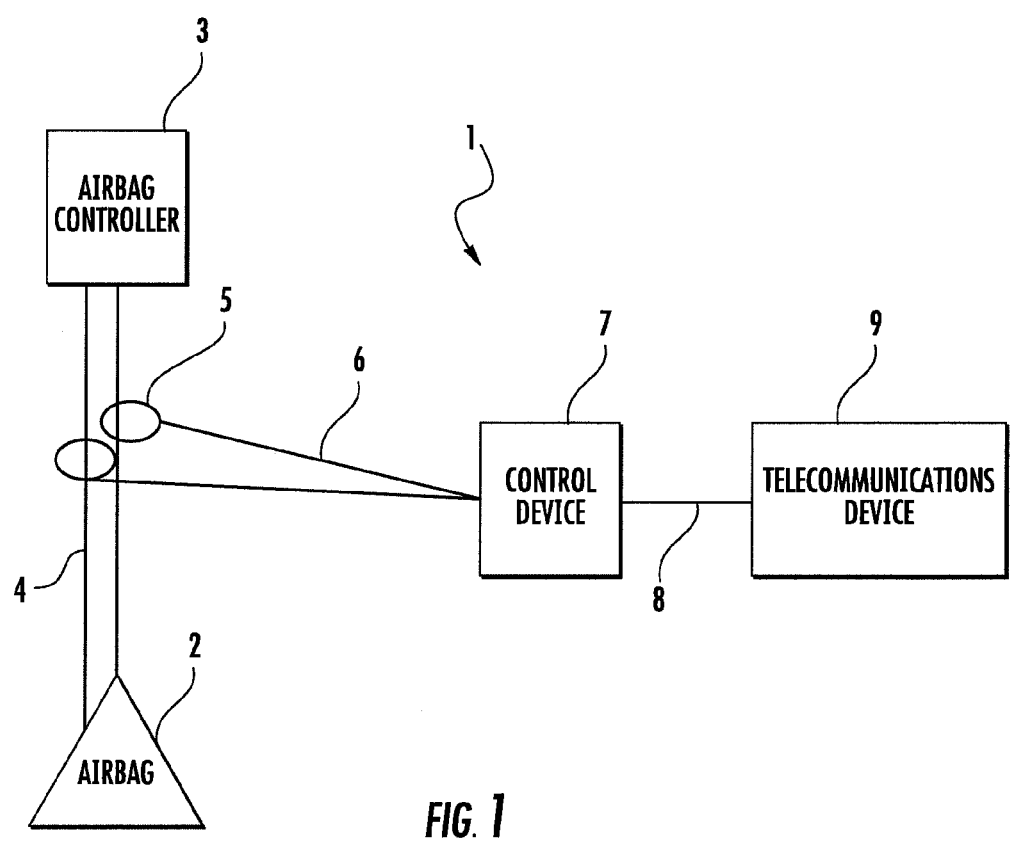
FIG. 1 is a schematic functional block diagram of a device according to an embodiment of the invention.

FIG. 1 shows a device 1 for triggering an emergency call in a vehicle equipped with an airbag 2. The device 1 has a control device 7 that is connected, for signaling purposes, to two Rogowski coils 5 via lines 6. The individual cables 4 of the firing line that connect the airbag 2 to an airbag controller 3 are guided through the Rogowski coils 5. In order to fire the airbag 2, the airbag controller 3 sends a firing voltage through the cables 4, which voltage induces a magnetic field in the cables 4. The induced field is detected by the Rogowski coils 5 and a corresponding signal is sent to the control device 7 through the lines 6. If the signal exceeds a set limit value, the control device 7 sends a signal to a telecommunications device 9 via the line 8 initiating the transmission of an emergency call. This may be, for example, a preset telephone number, a short message (SMS) or another suitable signal.

Figure 2:
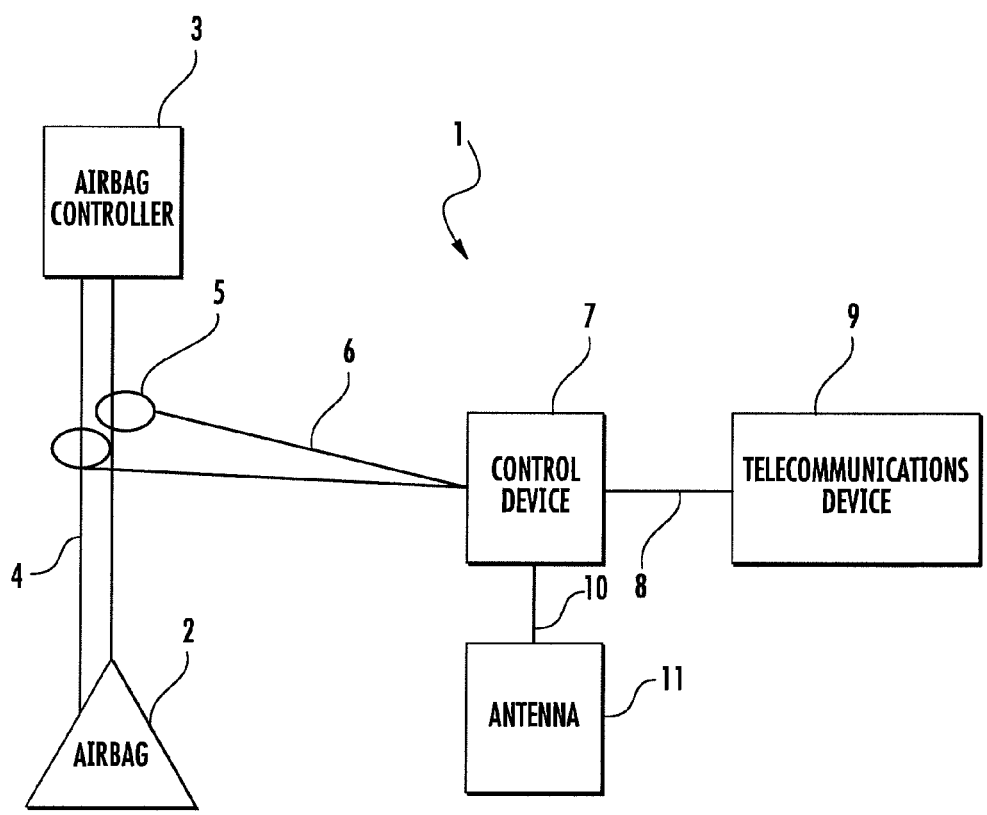
FIG. 2 is a schematic functional block diagram of one refinement of a device according to an embodiment the invention.

FIG. 2 shows one refinement of a device according to the invention, which refinement has, in addition to the components described in FIG. 1, an antenna 11 that receives an electromagnetic field induced by the firing of the airbag 2 and sends said field to the control device 7 as a signal via the line 10. The control device takes into account the signal received from the antenna 11 when initiating the emergency call.

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for triggering an emergency call in a vehicle equipped with an airbag, comprising:

inducing at least one of a magnetic field, an electrical field, and an electromagnetic field by firing the airbag; and initiating the emergency call based at least in part on the one of the magnetic field, the electrical field, and the electromagnetic field induced by the firing of the airbag.

2. The method as claimed in claim 1, further comprising:

measuring a field strength of the one of the magnetic field, the electrical field, and the electromagnetic field induced by a current flowing in at least one connection cable of the airbag by the firing of the airbag; and triggering the emergency call if a limit value of the measured field strength is exceeded.

3. The method as claimed in claim 2, wherein the induced field is measured using at least one of a Hall sensor, a Rogowski coil, a coaxial capacitor, and an electromagnetic far-field detector.

4. A device for triggering an emergency call in a vehicle equipped with an airbag, comprising:

a first device configured to transmit an emergency call;

a measuring device configured to measure a field strength of at least one of a magnetic field, an electrical field, and an electromagnetic field induced by firing the airbag; and a control device coupled to at least the first device and the measuring device and configured to send a triggering pulse for triggering the emergency call when the field strength exceeds a stored limit value.

5. The device as claimed in claim 4, wherein the measuring device for measuring the one of the magnetic field, the electrical field, and the electromagnetic field is at least one of a Rogowski coil, a Hall sensor, a magnetoresistive sensor, a Wiegand sensor, a SQUID sensor, a coaxial capacitor, and an electromagnetic far-field sensor.

6. The device as claimed in claim 5, wherein the stored limit value can be set.

7. The device as claimed in claim 5, wherein the device comprises at least two measuring devices.

8. The device as claimed in claim 4, further comprising at least one further sensor coupled to the control device and configured to detect the firing of the airbag.

9. The device as claimed in claim 4, wherein the device for triggering is configured to be retrofitted in the vehicle.

10. The device as claimed in claim 8, wherein the at least one further sensor configured to detect the firing of the airbag comprises at least one of an acceleration sensor and an acoustic sensor.

11. The method as claimed in claim 2, further comprising setting the limit value of the measured field strength.

12. The method as claimed in claim 1, further comprising retrofitting the vehicle with a device for triggering the emergency call when the airbag is fired.

* * * * *